United States Patent [19]

Nishida

[11] 4,283,021
[45] Aug. 11, 1981

[54] AUTOMATIC FILM RETRIEVER

[75] Inventor: Shigeki Nishida, Kainan, Japan

[73] Assignee: Noritsu Koki Co., Ltd., Wakayama, Japan

[21] Appl. No.: 48,227

[22] Filed: Jun. 13, 1979

[30] Foreign Application Priority Data

Jun. 17, 1978 [JP] Japan .................................. 53-73956
Sep. 5, 1978 [JP] Japan ................................ 53-108105

[51] Int. Cl.³ .......................................... B65H 75/02
[52] U.S. Cl. .................... 242/55; 242/71.1; 81/3 R
[58] Field of Search ............ 242/1, 71.1, 77, 55; 81/3 R; 226/91

[56] References Cited

U.S. PATENT DOCUMENTS

| | | | |
|---|---|---|---|
| 3,261,237 | 7/1966 | Sentiff | 81/3 R |
| 3,864,993 | 2/1975 | Hovind | 81/3 R |
| 4,047,853 | 9/1977 | Starr | 81/3 R |
| 4,074,870 | 2/1978 | Kauffman | 242/1 |
| 4,113,192 | 9/1978 | Osanai | 242/1 |
| 4,138,068 | 2/1979 | Kinoshita | 242/1 |

Primary Examiner—Leonard D. Christian
Attorney, Agent, or Firm—William E. Jackson

[57] ABSTRACT

An automatic film retriever comprising a first belt-like retriever plate of resilient material which is moved forward or backward in a desired order by a driving motor and which a second retriever plate arranged below the lower surface of the first retriever plate and having a part folded downward at a leading end thereof to be inserted into the cartridge, a torque motor for rotating the spool of the cartridge either in a clockwise or in a counterclockwise direction, a sound sensor for sensing a sound which is generated when the free end of the film is moved past said folded part upon rotation of the spool in such a direction as the film is wound into the cartridge, and an infrared rays sensor for determining if the free end of the film is pulled through the film retrieving opening of the cartridge or not, at first the first retriever plate being inserted into the cartridge, the spool being rotated in a film winding direction, the rotation of the spool being simultaneously stopped with a sensing of said sound, then the spool being rotated in an opposite direction to unroll the film, thereafter the second retriever plate being inserted into the cartridge, the free end of the film being held between the first retriever plate and the second retriever plate, the driving motor being rotated in an opposite direction, both retriever plates being moved backward and thus the free end of the film being pulled out of the cartridge.

6 Claims, 17 Drawing Figures

Fig.1-I
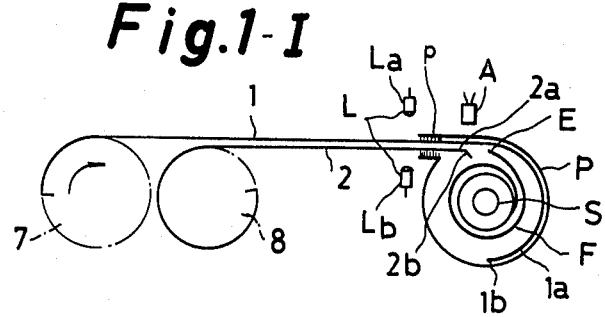
Fig.1-II
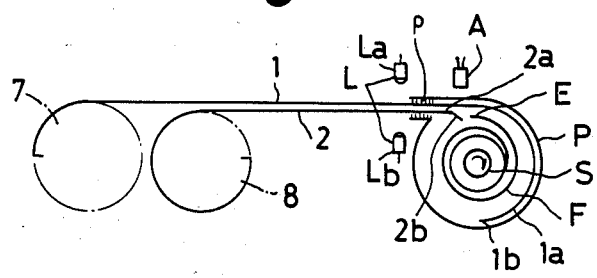
Fig.1-III
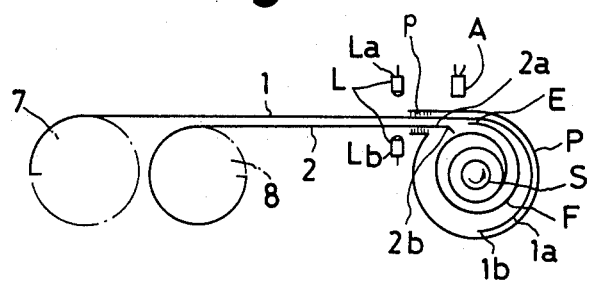

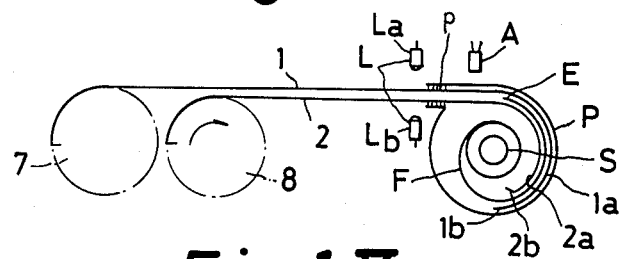
Fig.1-Ⅳ
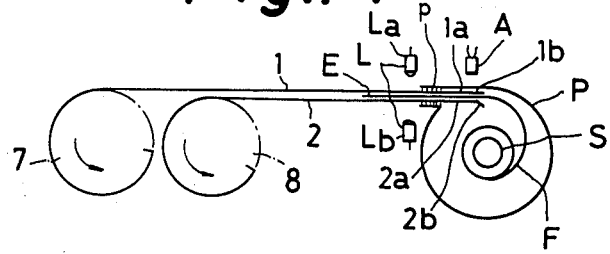
Fig.1-Ⅴ
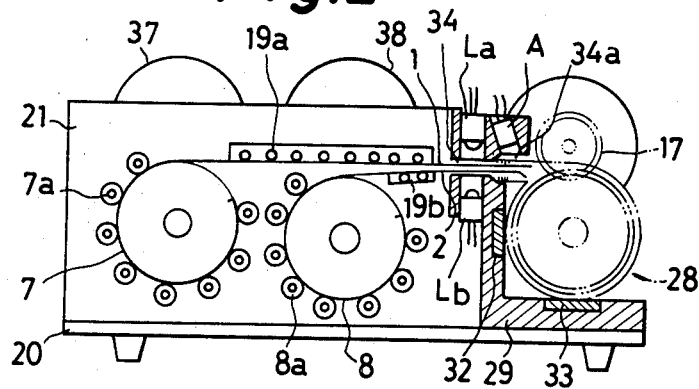
Fig.2

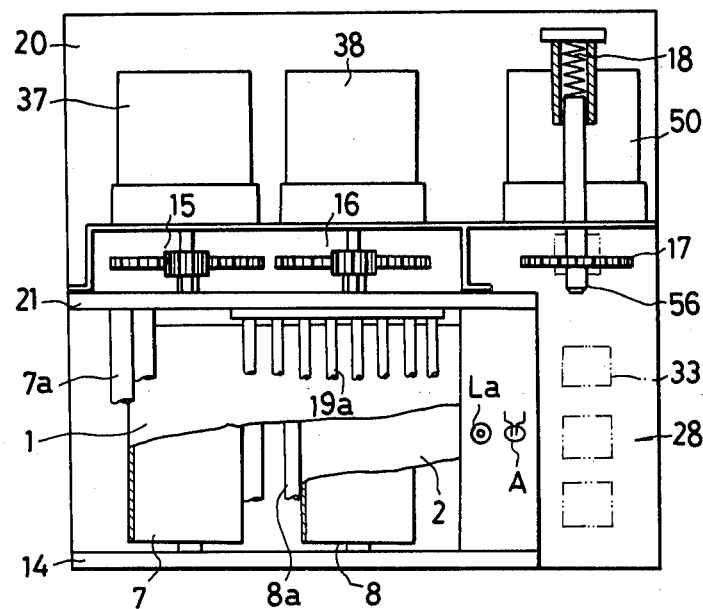

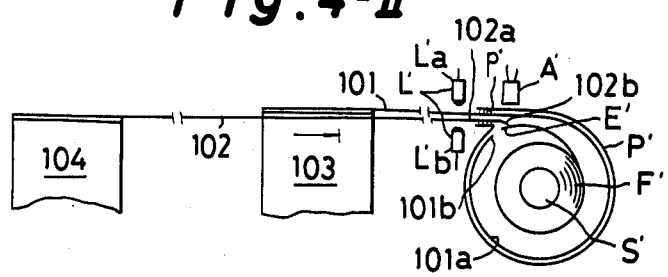
Fig. 4-II
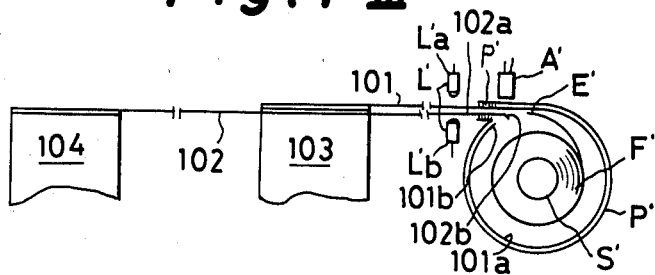
Fig. 4-III
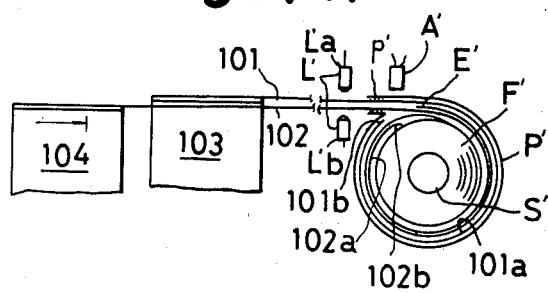
Fig. 4-IV

Fig. 4-Ⅴ
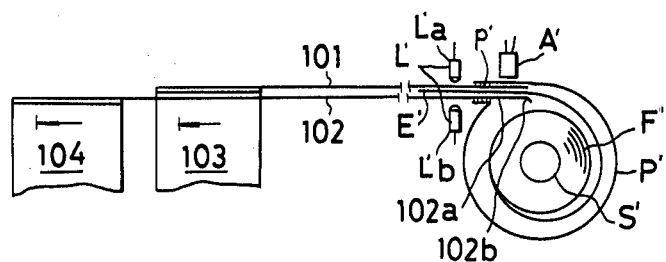
Fig. 5
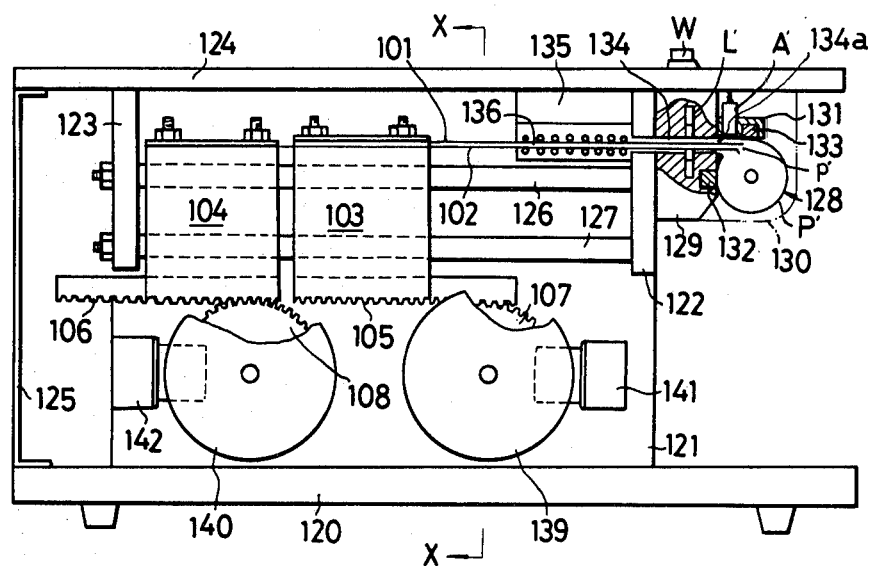

AUTOMATIC FILM RETRIEVER

BACKGROUND OF THE INVENTION

1. Field of the Invention

This invention relates to an improvement of a film retriever in which a free end of the film which has already been rewound in the cartridge upon completion of photographing, and more particulary an automatic film retriever having a feature in which a free end of a standard 35 millimeter film which has already been rewound in the cartridge may be pulled out of it automatically and efficiently without damaging it or film.

2. Description of the Prior Art

Among amateur and professional photographers nowadays, one of the most popular and highly consumed film formats is the 35 millimeter size film having no light shielding sheet in it (hereinafter called as merely a film). The film is kept wound on a spool in a cylindrical light shielding case called a patrone or a cartridge (called a cartridge hereinafter), only a free end of the film is placed outside the film retrieving opening applied with a balck plush in order to increase the light shielding characteristic.

In this type of cartridge the film should be rewound into the cartridge so as to eliminate the exposure when the cartridge is to be loaded in a camera and removed from it upon completion of the photographing. Almost all of the cameras having the 35 millimeter film therein have no provision for enabling the rewinding of the film into the cartridge with only a free end of the film being remained outside the cartridge, so that the film is to be rewound upon photographing of all the film frames, it is quite natural to say that even the free end of the film might be wound into the cartridge. Therefore, as described above, in a processing laboratory complying with a request for developing and printing the film of which even the free end has already been rewound into the cartridge, one of the side caps of the cartridge is normally removed from a cylindrical main body of the cartridge by utilizing a mechanical force and the spool on which the film is wound is removed from the main body of the cartridge, so that it is often recognized that the cartridge may not be used again. Further, as described above, since removing one of the side caps from the main body of the cartridge means that each of the main body of the cartridge, one of the side caps and the spool is separated from one another, this operation will require not only a management over these operations but also, as described above, causes some troubles in which one of the side caps is scattered away when one of the side caps is removed from the main body of the cartridge and in which surplus burden is applied to the operator for collecting these scattered parts in order to prevent some problems in the management over the operation and the burden results in one of the causes for decreasing an efficiency of the operation. And this trend becomes more and more conspicuous as the number of general consumers for the film is increased with the spread of cameras and the improvements over this trend are demanded more and more by the consumers.

As a new technology which has been devised and developed for providing an improvement over these problems, U.S. Pat. No. 3,261,237 has been granted. In this patent the free end of the film which has already been rewound into the cartridge is pulled out of the cartridge by applying a careful handling of an elongated tool having a special shape. Another prior art approach is found in U.S. Pat. No. 3,864,993. In this patent an adhesive patch is applied at the leading end of a foldable blade in order to pull the free end of the film out of the cartridge. Yet further prior art is found in U.S. Pat. No. 4,047,653. This patent discloses curved inner and outer jaws which are movable with respect to one another, and the operation involves inserting the jaw ends into the cartridge, rotating the film within the cartridge until the free end is between the jaw ends, and grasping the film with the jaw ends. One drawback of these prior art devices is that they are manually operated which will require some skill of operation. Inefficiency is found at a processing laboratory where this kind of cartridge should be processed on a commercial basis and it is possible to say that these operations would cause some delay in a series of operations of developing etc.

SUMMARY OF THE INVENTION

In view of the present situation described above, this invention has, as an object, the provision of such an automatic film retriever which is suitable for use in a processing laboratory having a large volume of this kind of cartridge handled and processed in which a free end of the film is pulled out through a film retrieving opening without removing one of the side caps from a main body of the cartridge forming a cylindrical light shielding case of the cartridge and further without requiring the skill of the operator under a highly efficient and automatic manner after the cartridge has been loaded in the camera for the 35 millimeter film and the film has been rewound upon completion of the photographing in case of a retrieval of the film from the cartridge into which even the free end of the film had already been rewound. According to one embodiment of the invention, the automatic film retriever is comprised of:

a. a cartridge loading part having an insertion opening into which a film retrieving opening of the cartridge is inserted at one side thereof, a guide hole passage with a narrow clearance connected thereto and in addition a cartridge fixing member:

b. separate motors which are arranged at the side opposite to said one side against said cartridge loading part and which may be rotated either in a clockwise or in a counter-clockwise directions:

c. one first belt-like retriever plate of a resilient material a free end of which is moved forward or backward into said insertion opening through the guide hole passage by one of said motors and thereby set to hold a free end of the film which has already been rewound in the cartridge:

d. a second retriever plate, a free end of which is contacted along a lower surface of said first retriever plate, moved forward or backward into said insertion opening through the guide hole passage by the other of said motors, the leading end of the free end of the second retriever plate being made to form a folded part which is folded toward a central portion of the cartridge of which film retrieving opening is inserted into the insertion opening of said cartridge loading part and fixed therein, the second retriever plate being made of the same material as said first retriever plate and set to hold a free end of the film along with the first retriever plate:

e. a torque motor to be engaged with a spool of the cartridge when the cartridge is firmly held at said cartridge loading part and enabling the spool of the held cartridge to be rotated either in a clockwise direction or in a counter-clockwise direction:

f. a sound wave sensor mounted near said insertion opening in order to sense a sound generated when a free end of the film is moved past a folded part of a leading end of the second retriever plate which is slightly inserted into the cartridge through the film retrieving opening and to reverse a direction of rotation of said torque motor when the spool is rotated by said torque motor in a film winding direction after the free end of said first retriever plate is inserted into the cartridge through the film retrieving opening of the cartridge which is fixed to said cartridge loading part, whereby the first and second retriever plates are inserted in sequence through the film retrieving opening into the cartridge fixed to the cartridge loading part and thus the free end of the film which has already been wound in the cartridge may be pulled out of the cartridge while being held between the two plates.

As apparent from the above description, it is an object of the present invention to provide an automatic film retriever in which a free end of the film may be pulled out automatically through the film retrieving opening without removing side caps of the cartridge when the film is to be removed from the cartridge into which even the free end of the film has already been rewound in case that the cartridge has been loaded in the camera for the 35 millimeter film and the film is to be rewound upon completion of the photographing of all the film frames.

It is another object of the present invention to provide a film retriever requiring no skill or attention of the operator and which is suitable for being applied in a processing laboratory for processing a large number of this kind of cartridges under a highly efficient manner.

It is still a further object of the present invention to provide a film retriever which may be simply constructed and less expensive.

These and other objects, features and advantages of the present invention will become apparent to those skilled in the art from a reading of the description of the preferred embodiment to follow, taken in conjunction with the attached drawings.

The accompanying drawings illustrate the configurations of two preferred embodiments of the automatic film retriever in accordance with the present invention.

BRIEF DESCRIPTION OF THE DRAWINGS

The accompanying drawings illustrate two preferred embodiments of and automatic film retriever of the present invention, in which, FIG. 1 consisting of FIG. 1-I, FIG. 1-II, FIG. 1-III, FIG. 1-IV and FIG. 1-V is a process diagram, before a practical arrangement of the automatic film retriever of the first preferred embodiment of the present invention is described in reference to the drawings, for use in illustrating an order in which a free end or leading end of a film which has already been wound in a cartridge is held between a first and a second retriever plates and pulled out of the cartridge through a film retrieving opening of the cartridge.

FIG. 2 is a front elevational view for illustrating the components of a first preferred embodiment in which certain portions of the first preferred embodiment are broken away, such components as may be easily understood by those skilled in the art are eliminated or simplified as much as possible.

FIG. 3 is a top plan view for illustrating the component parts of the first preferred embodiment, similar to that of FIG. 2, in which certain portions of the first preferred embodiment are broken away and component parts which may easily be understood by those skilled in the art are eliminated or simplified as much as possible.

FIG. 4 consisting of FIG. 4-I, FIG. 4-II, FIG. 4-III, FIG. 4-IV and FIG. 4-V is a process diagram, before a practical arrangement of a automatic film retriever of the second preferred embodiment is illustrated and described, for use in illustrating an order in which a free end or a leader of the film which has already been wound in the cartridge is pulled out through the film retrieving opening.

FIG. 5 is a front elevational view for illustrating the component parts of the second preferred embodiment in which certain portions of the preferred embodiment are broken away and the component parts which may easily be understood by those skilled in the art are eliminated or simplified as much as possible.

DESCRIPTION OF THE PREFERRED EMBODIMENT

Figure 6:
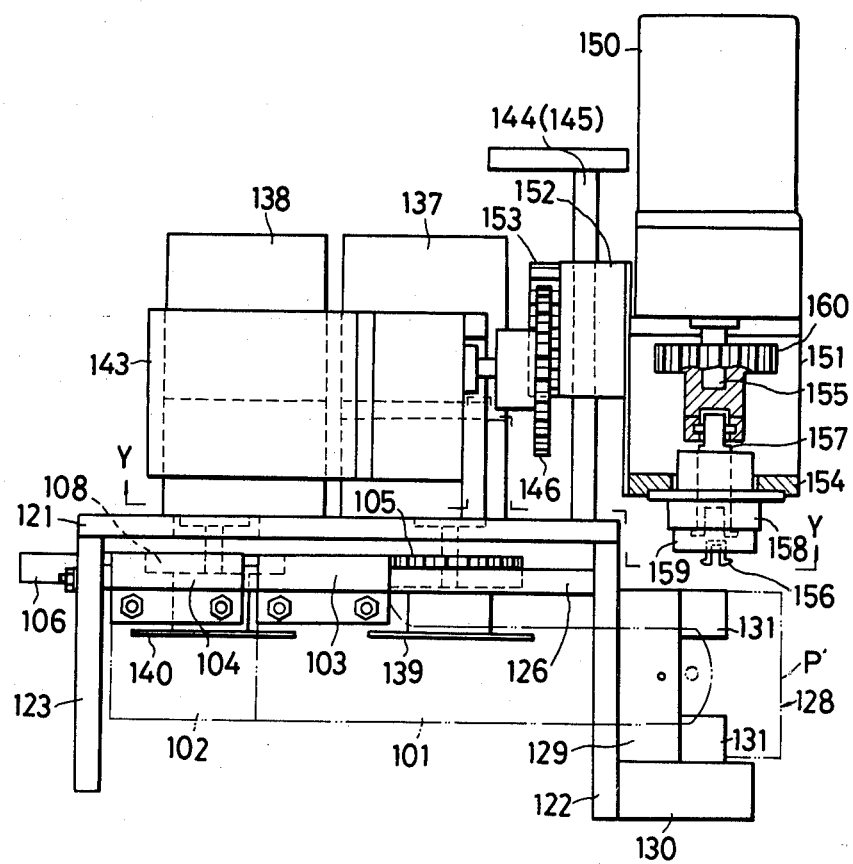
FIG. 6 is a top plan view, similar to FIG. 5, in which certain portions of a second preferred embodiment are broken away and the component parts which may easily be understood by those skilled in the art are eliminated or simplified as much as possible.
Figure 7:
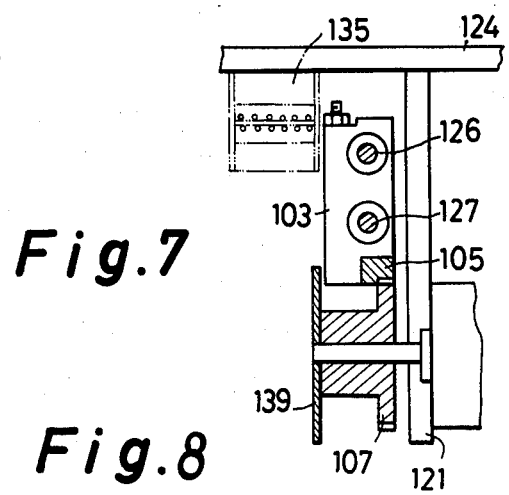
FIG. 7 is a side elevational view partly in section along line X—X of FIG. 5 in a direction indicated by arrows.
Figure 8:
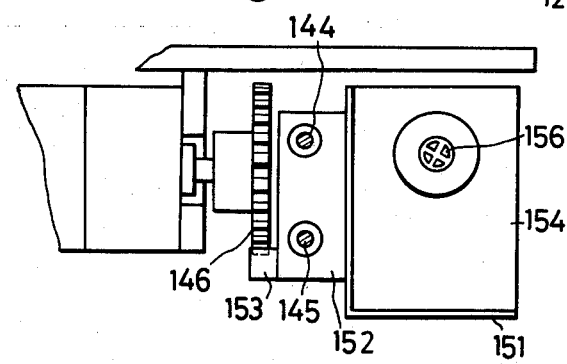
FIG. 8 is a front elevational view partly in section along line Y—Y of FIG. 6 in a direction indicated by arrows.

At first, an order in which a free end or leader of the film which has already been wound in a cartridge is held between a first and a second retriever plates of the components of a first preferred embodiment and pulled out through a film retrieving opening will be described in reference to FIGS. 1-I, 1-II, 1-III, 1-IV and 1-V so that an entire arrangement of the first preferred embodiment of the present invention may positively be understood.

In FIGS. 1-I, 1-II, 1-III, 1-IV and 1-V, a reference symbol P indicates a cartridge, a reference symbol F shows a film of which even a free end or leader thereof has already been rewound (or same meaning of wound in) in the cartridge P after a photographing operation is finished, and a reference symbol E designates a free end or leader of the film F. A reference symbol p shows a film retrieving opening and a reference symbol S indicates a spool which is rotatably supported by the opposite side caps of the cartridge P. Reference numeral 1 is a belt-like first retriever plate made of a resilient material, reference numeral 1a shows a free end of a leader of the first retriever plate, reference numeral 1b indicates a leading end of the free end, reference numeral 2 indicates a belt-like second retriever plate which is also made of the same material as that of the first retriever plate 1, and a leading end of the free end 2a i.e. a leading end of the second retriever plate is folded downward to form a fold part 2b. Reference numeral 7 indicates a first rotor onto which a tail end of the first retriever plate 1 is wound, reference numeral 8 shows a second rotor onto which a tail end of the second retriever plate 2 is wound, reference symbol A is a sound wave sensor, reference symbols La and Lb illustrate a light emitter and a light receiver, respectively, of an infrared rays sensor L for detecting if the free end E of the film F is pulled out of the cartridge or not.

Thus, an order in which the free end E of the film F is held between said first retriever plate 1 and said second retriever plate 2 and pulled out of the cartridge is such that at first the aligned leading ends of the free ends 1a, 2a of both first and second retriever plates 1 and 2 are slightly inserted into the cartridge P through the film retrieving opening p of the cartridge P and then the free end 1a of the first retriever plate 1 is inserted along the inner peripheral surface of the cartridge P by an amount more than half of the circumference and less than one circumference, that is as shown in FIG. 1-I. Then, as illustrated in FIG. 1-II, when the spool is rotated in a clockwise direction, the film F is wound in the cartridge, the free end E is moved while being contacted with the lower surface of the first retriever plate 1 and a sound which will be generated when the free end E moves past the folded part 2b at the leading end of the second retriever plate 2 slightly inserted into the cartridge P is detected by a sound wave sensor A and the rotation of the spool S is stopped simultaneously with the sensing of the sound. Then, as shown in FIG. 1-III, the spool S is rotated in a counter-clockwise direction to rewind the film F, the free end E of the film F is contacted the lower surface of the first retriever plate 1. Thus, as illustrated in FIG. 1-IV, the second retriever plate 2 is inserted into the cartridge P along the lower surface of the first retriever plate 1, the free end E of the film F is held between the free ends of the first and second retriever plates 1 and 2 to form a held condition, and as illustrated in FIG. 1-V, the first and second retriever plates 1 and 2 are pulled out simultaneously through the film retrieving opening p of the cartridge P, the free end E of the film F is pulled out of the cartridge along with the first and second retriever plates 1 and 2 through the film retrieving opening p. The free end of the film is sensed by the infrared rays sensor L, the retrieving operation for the first and second retriever plates 1 and 2 is terminated and to the contrary, if the free end (of the film) may not be sensed, the retrieving operation may be repeated again.

Then, in reference to FIGS. 2 and 3, a practical arrangement of the automatic film retriever of the first preferred embodiment which is operated as described above will be explained hereinbelow. In these figures, it is to be noted that all the component parts having the same reference numerals as indicated in each of the views of FIG. 1 are the same.

In FIGS. 2 and 3, the component part designated at 20 is a base, reference numeral 21 indicates a vertical frame which is substantially located at a central part of the base, reference numeral 14 shows a front frame. (A top plate and side plates etc. are eliminated for the sake of clarity in the drawings.) Reference numerals 37, 38 and 50 show a first motor, a second motor and a torque motor, respectively, which are mounted on the base 20. Reference numerals 7 and 8 indicate a first rotor and a second rotor, respectively, which are rotatably carried between the frames 21 and 14 by the bearings (not shown) arranged in the vertical frame 21 and the front frame 14. These rotors are operatively connected to the first motor 37 and the second motor 38 via gear reduction mechanisms 15 and 16 as illustrated in the drawings. Reference numeral 17 shows a reduction gear mechanism in the torque motor 50. Thus, around the first rotor 7 is wound the tail end of the first retriever plate 1, and around the second rotor 8 is wound the tail end of the second retriever plate 2.

Further, a component part designated at 28 in the drawing indicates a cartridge charging part arranged at the right side of the second rotor 8. The cartridge charging part is mainly comprised of an insertion port 34a for supporting the film retrieving opening p of the cartridge P fixed on the base 20, a guide passage 34 with a narrow clearance which is used for guiding the leading ends of the free ends 1a and 2a of the first and second retriever plates 1 and 2 and for facilitating an insertion of the leading ends into the film retrieving opening p which is inserted into said insertion opening 34a, and a L-shaped frame 29 provided with magnets 32 and 33 for use in fixing the cartridge etc.

An output shaft 56 of the reduction gear mechanism 17 as described above is supported by a spring 18 in such a way that it may be moved back and forth. The output shaft 56 is constructed such that when the film retrieving opening p of the cartridge P is loaded laterally so as to be inserted into the insertion opening 34a in the cartridge loading part 28, the output shaft is abutted against a projected end of the spool S of the cartridge P and engagaged therewith. The spool S is operatively connected to the torque motor 50.

Further, the component parts generally designated at 7a and 8a are guide rollers each of which is arranged along the outer circumferences of the first rotor 7 and the second rotor 8, the reference symbols 19a and 19b are the guide rollers which are used for guiding the first and second retriever plates 1 and 2 into the guide passage 34 extending to the insertion opening 34a. Reference symbol L indicates an infrared rays sensor consisting of the light emitter La and the light receiver Lb arranged such that they will form a pair of upper and lower means over the guide passage 34 near a connection between said insertion port 34a and the guide passage 34. Between the light emitter and the light receiver is arranged an infrared rays permeation hole (not shown) made so as to pass through the free ends 1a and 2a of the first retriever plate 1 and the second retriever plate 2.

The order of the retrieving operation for the leading end E of a leader of the film F which has already been rewound in the cartridge P in the first preferred embodiment having such configurations as described above is such that, as apparent from the above description, the leading ends of the free ends 1a and 2a of the first retriever plate 1 and the second retriever plate 2 are aligned with one another and located adjacent to the insertion opening 34a via guide passage 34, the cartridge P is loaded laterally at the cartridge loading part 28 and fixed to the magnets 32 and 33, then the leading ends of the free ends 1a and 2a of the first retriever plate 1 and the second retriever plate 2 are slightly inserted into the cartridge P via the guide passage 34. Then, when the first motor 37 is operated, a rotation of the first motor 37 is transmitted to the first rotor 7 via reduction gear mechanism 15, the free end 1a of the first retriever plate 1 of which tail end is wound around the first rotor 7 is sufficiently inserted into the cartridge P as already described above and illustrated in FIG. 1-I, the rotation of the first motor 37 is stopped and at the same time the torque motor 50 is driven to rotate the spool S in a clockwise direction viewed in the drawing i.e. in such a direction as the film F is wound in, a sound which is generated when the free end E of the film is moved past the folded part 2b of the second retriever plate 2 slightly inserted into the cartridge P is sensed by the sound wave sensor A and thereby the rotation of the torque motor 50 is instantenously stopped (see FIG. 1-II).

Then, when the torque motor 50 is rotated in an opposite direction to rewind the film F, the free end E thereof is contacted with the lower surface of the first retriever plate 1 (i.e. the surface confronting to the spool S of the cartridge P under such conditions) and at the same time a reaction force will be increased. When the reaction force is reached to the desired value, the rotation of the torque motor 50 will be stopped (see FIG. 1-III).

Then, when the second motor 38 is operated, the rotation thereof is transmitted to the second rotor 8 via reduction gear mechanism 16. When the free end 2a of the second retriever plate 2 of which tail end is wound around the second rotor 8 is inserted into the cartridge P at the same degree as that of the first retriever plate 1 along the lower surface of the first retriever plate 1 as described above and illustrated in FIG. 1-IV, the free end E of the film F is held between the first retriever plate 1 and the second retriever plate 2. Thus, when the first motor 37 and the second motor 38 are simultaneously rotated in such a direction as opposite to said rotational direction, both the first retriever plate 1 and the second retriever plate 2 are pulled out through the film retrieving opening p of the cartridge P while the free end E of the film F is held between the free ends 1a and 2a thereof as described above and illustrated in FIG. 1-V, and this retrieving operation is continued until the free end is sensed by the infrared rays sensor L and the operation is terminated upon completion of the sensing.

In brief, in the first preferred embodiment of the automatic film retriever, a sensing of a position of the free end E of the film F stored in the cartridge P is to be performed by the sound wave sensor A, and thereby the free end E of the film is positively held between the first retriever plate 1 and the second retriever plate 2 and at the same time the sensing operation is to be utilized for controlling each of the driving motors. In addition thereto, the torque motor 50 is used for rotating the spool S, so that when the free end 2a of the second retriever plate 2 is to be inserted into the cartridge, the film is unrolled not too excessively and at the same time the insertion of the second retriever plate 2 may easily be performed, and further this will enable not only the free end E of the film F to be held between the first and second retriever plates 1 and 2 but also the free end to be pulled out too easily through the film retrieving opening p of the cartridge P without damaging the free end E of the film F.

Then, an arrangement of the second preferred embodiment will be described in such an order as illustrated in FIG. 4 in reference to FIG. 5 and other figures showing the arrangement of the second preferred embodiment in which even the free end of the film already rewound into the cartridge is to be pulled out again through the film retrieving opening in the cartridge, and thereby in addition to the description of FIG. 4, a practical arrangement of the second preferred embodiment may easily be understood.

Figure 9:
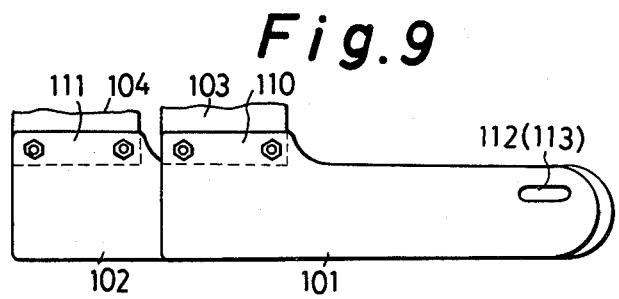
FIG. 9 is a top plan view for illustrating only the arrangement and practical relationship of a first and a second retriever plates placed at a position either before the first and second retriever plates are normally set or returned after their operations and ready to operate.

In these figures, the component parts designated at 101 and 102 are a first retriever plate and a second retriever plate similar to the first retriever plate and the second retriever plate of the first preferred embodiment, the tail ends thereof are, as illustrated in FIG. 9, provided with lateral projections 110 and 111, one of the projections 110 is fixed to a first retriever plate block 103, the other of the projections 111 is fixed to the second retriever plate block 104. Although illustration is eliminated in the first preferred embodiment, at the leading ends of both free ends 101a and 102a of the first retriever plate 101 and the second retriever plate 102 are provided perforations 112 and 113 which are to be aligned to one another when the leading ends substantially aligned (the illustration thereof is eliminated in the first preferred embodiment). The leading end of the free end 102a of the second retriever plate 102 is folded in the same way as the folded part 2b of the leading end of the second retriever plate 2 in the first preferred embodiment and thereby to form a folded part 102b. Reference numerals 105 and 106 indicate racks arranged in the first retriever plate block 103 and the second retriever plate block 104, respectively, and reference numerals 107 and 108 indicate pinions to be engaged with the racks.

The component parts indicated by the reference symbols P', S', F', E', p', A' and L' consisting of L'a and L'b are the same component parts as in the first preferred embodiment, i.e. the cartridge P, its spool S, film F wound on the spool S, the free end E of the film, film retrieving opening p, sound wave sensor A, and the infrared rays sensor L having the light emitter La and the light receiver Lb etc. Thus, when the arrangement of the first preferred embodiment and that of the second preferred embodiment are described in reference to one another, a substantial volume of description may be required, thus they are eliminated as much as possible in the following description and an arrangement of the second preferred embodiment will be described. The component part designated at 120 indicates a base, reference numeral 121 shows a vertical frame which is mounted substantially at the central part of the base 120. From the upper side edges of the vertical frame are projected the support frames 122 and 123 extending in the same forward direction. Reference numeral 124 indicates a top plate, reference numeral 125 shows a side plate. Some of these component parts including the base 120 are eliminated for the sake of clarity in illustration and description of other component parts.

Reference numerals 126 and 127 indicate the upper and lower guide rails fixed between said support frames 122 and 123, and the first retriever plate block 103 and the second retriever plate block 104 are movably supported on the guide rails. Reference numeral 128 indicates a loading part for the cartridge P'. The loading part is comprised of a major plate 129 fixed to a front surface of the support frame 122, a reception plate 130 fixed at a side of the major plate 129 far from the vertical frame 121 and receiving one side surface of the cartridge P, and a stopper plate 131 for restricting the upper limit position of the cartridge P etc. In the major plate 129 and the stopper plate 131 are embedded the magnets 132 and 133 for use in temporarily fixing the cartridge P'.

A guide hole passage 134 is formed for the first retriever plate 101 and the second retriever plate 102 via support frame 122 and the major plate 129. A portion of said guide hole passage 134 which is opened or communicated with the cartridge loading part 128 is made to be an insertion opening 134a for the film retriever opening p' and further made in series such that the first retriever plate 101 and the second retriever plate 102 which are passed through the guide hole passage 136 in the guide member 135 with a guide hole passage of both retriever plate 101 and 102 arranged at the opposite side of the major plate 129, and further in the upper and lower notches opened at the guide hole passage 134 is arranged the infrared rays sensor L' consisting of a light emitter L'a and a light receiver L'b, and in front of the major plate 129 and at the upper position of the cartridge P' loaded is arranged a sound wave sensor A', respectively.

The first motor 137 and the second motor 138 which rotate said pinions 107 and 108 via reduction gear mechanism in a clockwise or counter-clockwise direction are arranged at a rear surface of the vertical frame 121, while at the shafts of the pinions 107 and 108 are arranged the adjustable sensor discs 139 and 140 (i.e. the component parts of which description and illustration are eliminated in the first preferred embodiment) for immediately ceasing the driving forces of the first motor 137 and the second motor 138 when the pinions 107 and 108 are rotated either in a clockwise or counter-clockwise directions at any desired angle or by any desired number of rotations, and also arranged the sensors 141 and 142 (i.e. the component parts of which description and illustration are eliminated in the first preferred embodiment). The sensor means 141 and 142 are arranged such that they are ready to operate for a subsequent sensing operation after each of the sensing operations is completed. The voltages to be applied to the first motor 137 and the second motor 138 are set to about 75 V in reference to a standard voltage of 100 V so as not to damage the retriever plates 101 and 102 when too excessive load is applied to either the first retriever plate 101 or the second retriever plate 102, and thereby the voltages are restricted.

And at the rear surface of the vertical frame 121 are mounted a cartridge fixing motor 143 which will move a spool rotational torque motor 150 to be described later toward and away from the cartridge loading part 128 and which may be rotated in a clockwise or counter-clockwise directions and further may be restricted, and two upper and lower guide rails 144 and 145.

The spool rotational torque motor of said component parts designated at 150 is mounted on a frame 151. The frame 151 is arranged such that a sliding member 152 projected laterally from the frame 151 is guided by said guide rails 144 and 145, and a rack 153 formed in the sliding member 152 is engaged with a pinion 146 which will be rotated by a rotation of said cartridge fixing motor 143 via reduction gear.

A frame 154 which is installed in front of the cartridge loading part 128 of the machine frame 151 supports a bearing 158 for a transmitting shaft 157 for a spool rotation provided with a spool rotational connecting pin 156 at the leading end thereof which is connected to a rotational shaft 155 to be rotated by a spool rotational torque motor 150 via reduction gear. At the front surface of the bearing 158 is arranged a cartridge fixing resilient means 159 to be abutted against other side plate of the cartridge P and to be used for fixing the cartridge P'.

Furthermore, although not shown in the drawings, an infrared rays sensor etc. is arranged for sensing that a sliding part 152 integral with the frame 151 is reached to a position in which the cartridge P is truly fixed, and further arranged for driving the driving motor 137 for the first retriever plate 101, the sensing signal transmitted from the sound wave sensor A' is used for terminating a rotation of the torque motor 150 for use in rotating the spool, and in turn a clutch brake to be operated in reference to the sensed signal is installed in the frame 151, a gear fixed to the clutch brake shaft is engaged with a stop gear 160 fixed on said rotary shaft 155 and thereby a rotation of the torque motor 150 for a rotation of the spool is instantenously stopped.

Reference symbol W shown in the drawings indicates a switch for use in starting the operation of the system, and other arrangements will be described along with a description of the following operation or handling for the present system constructed as described above.

Thus, in operation of the present system, at first the leading ends of the aligned free ends 101a and 102a of the first retriever plate 101 and the second retriever plate 102 are inserted into the film retrieving opening p of the cartridge P, the cartridge is temporarily fixed, as shown in FIG. 4-I, to the major plate 129 of the loading part 128 for the cartridge P and the reception plate 131 under a utilization of the magnets 132 and 133, the switch W for use in starting the operation of the present system is operated to start the system, and thereby the torque motor 150 for the rotation of the spool starts to rotate in such a direction as the film F' is wound into the cartridge and the cartridge fixing motor 143 starts to rotate in such a direction as the frame integral with the sliding part 152 is moved toward the cartridge fixing direction via pinion 146 and the rack 153.

Then, the spool rotational connecting pin 156 of the spool rotational transmitting shaft 157 connected to the rotational shaft 155 of the spool rotational motor 150 rotates the spool S', the cartridge P' is truly fixed by the cartridge fixing resilient material 159 attached to the bearing 158 and thereby the spool S' continues to rotate. Under such conditions as described above, the cartridge fixing motor 143 is restricted to maintain a true fixing force, while the first motor 137 is started to operate in reference to a signal showing a stopped condition of the sliding part 152, the first retriever plate block 103 is moved along the guide rails 126 and 127 via pinion 107 and the rack 105, inserted into the cartridge P until the first retriever plate 101 is stopped by the sensing disc 139 and the sensor 141, stopped at substantially a half or complete circumference of the cartridge P resulting in a condition shown in FIG. 4-II.

When the first retriever plate 101 is sufficiently inserted into the cartridge and stopped therein, the sound wave sensor A' will start to operate i.e. sense a sound which will be generated when the free end E' of the film F' is moved past the folded part 102b of the second retriever plate 102 slightly inserted into the film retrieving opening p', when sensed the sound, the sensing signal is used for stopping the energization of the spool rotational torque motor 150 and at the same time for operating the clutch brake (not shown in the drawing) to stop the rotation of the rotary shaft 155 instantenously even through the stopping gear 160 at a position where the free end E' of a leading end of the film F' is slightly moved past the folded part 102b of the second retriever plate 102 resulting in a condition shown in FIG. 4-III.

The operational time of the clutch brake is short, i.e. one or some tenth of a second is needed to release and at the same time the spool rotational torque motor 150 is rotated in an opposite direction, i.e. in such a direction as a roll of the film F' is unrolled, a free end E' of the film F' is contacted with the first retriever plate 101, the second motor 138 is operated, the second retriever plate block 104 is moved along the guide rails 126 and 127 via pinion 108 and the rack 106, a leading end of the second retriever plate 102 is inserted into the cartridge until the same is substantially aligned with the leading end of the first retriever plate 101 by the sensing disc 140 and the sensor 142, the free end E' of the film F' is held between the first retriever plate 101 and the second retriever plate 102 resulting in a condition shown in FIG. 4-IV.

The signal from the above described sensor 142 is used to provide an opposite rotation of the first motor 137 and the second motor 138 for the first and second retriever plate blocks 103 and 104, respectively, the first and second retriever plates 101 and 102 are returned to their original positions by utilizing the sensing discs 139 and 140 which may be set to operate after starting of the opposite rotation and utilizing the sensors 141 and 142, the free end E' of the film F' is efficiently and positively pulled out through the film retrieving opening p' under an additional application of a force from the spool rotational torque motor 150 which is continued to rotate in an opposite direction, resulting in a condition shown in FIG. 4-V.

A variation found in an amount of light passed through the perforations 112 and 113 of the first and second retriever plates 101 and 102 is to be sensed by the infrared rays sensor L' in order to determine if the free end E' of the film F' is positively pulled out of the cartridge by the first and second retriever plates 101 and 102. When not pulled out, the operation is automatically repeated from the beginning. When not pulled even if three times repetitions are made, the buzzar rings intermittently and a red lamp is lit to inform the operator.

In brief, in the automatic film retriever of the second preferred embodiment constructed in accordance with the present invention, the spool S' is rotated in such a direction as the film F' is wound into the cartridge in cooperation with a final fixing of the cartridge subsequent to a temporary fixing in which two first retriever plate 101 and the second retriever plate 102 are inserted into the film retrieving opening p', the first retriever plate 101 may easily be inserted around an outer circumference of the film F' wound into the cartridge P' and at the same time a sound which will be generated when the free end E' of the film F' is moved past the folded part 102b at the leading end of the second retriever plate 102 is made to be increased, the sound is sensed by the sound wave A' which may easily sense a sound, the rotation of the spool S' is terminated simultaneously with a sensing of the sound, so that the free end E' of the film F' is always placed substantially at the same position where the free end may easily be held between the first retriever plate 101 and the second retriever plate 102 even if the cartridge P' is replaced with another cartridge, thereafter the spool S' is rotated in an opposite direction, the second retriever plate 102 is inserted after the free end E' of the film F' is contacted along the first retriever plate 101, so that the free end E' of the film F' is firmly held between the first retriever plate 101 and the second retriever plate 102 to cause the free end E' of the film F' to be easily pulled out of the cartridge, and further during a film retrieving operation, the spool S' continues to rotate in an opposite direction, so that a probability of success to be found in the retrieving operation for the free end E' of the film F' will be increased more than that of the above described first embodiment and thus it has been found that the retrieving operation may be performed positively, for example, at a high rate of efficiency of about 100%.

As apparent from the above description of the two preferred embodiment of the present invention, it may be understood that the film retriever of the present invention in which an automatic and high efficient retrieving of a free end of the film out of the cartridge having even the free end of the film wound therein during a film unrolling operation to be performed upon completion of the photographing may be performed without damaging not only this cartridge but also the film stored therein may provide such a film retriever as required in a processing laboratory where a great number of various kinds of this type of cartridge may be processed.

The invention having been thus described, what is claimed as new and desired to secure by Letter Patent is:

1. An automatic film retriever characterized in that the same is comprised of
   a. a cartridge loading part having an insertion opening into which a film retrieving opening of the cartridge is inserted at one side thereof, a guide hole passage with a narrow clearance connected thereto and in addition a cartridge fixing member,
   b. separate motors which are arranged at the side opposite to said one side against said cartridge loading part and which may be rotated either in a clockwise or in a counter-clockwise direction,
   c. one first belt-like retriever plate of a resilient material of which the free end is moved forward or backward into said insertion opening through the guide hole passage by one of said motors, inserted into the cartridge through the film retrieving opening of the cartridge fixed at a cartridge loading part, and thereby set to hold a free end of the film which has already been rewound in the cartridge,
   d. a second retriever plate of which the free end is contacted along a lower surface of said first retriever plate, moved forward or backward into said insertion opening through the guide hole passage by the other of said motors, a leading end of the free end of the second retriever plate being made to form a folded part which is folded toward a central portion of the cartridge of which film retrieving opening is inserted into the insertion opening of said cartridge loading part and fixed therein, the plate being made of the same material as said first retriever plate and set to hold a free end of the film along with the first retriever plate,
   e. a torque motor to be engaged with a spool of the cartridge when the cartridge is firmly held at said cartridge loading part and enabling the spool of the held cartridge to be rotated either in a clockwise direction or in a counter-clockwise direction,
   f. a sound wave sensor mounted near said insertion opening in order to sense a sound generated when a free end of the film is moved past a folded part of a leading end of the second retriever plate which is slightly inserted into the cartridge through the film retrieving opening and to reverse a direction of rotation of said torque motor when the spool is rotated by said torque motor in a film winding direction after the free end of said first retriever plate is inserted into the cartridge through the film retrieving opening of the cartridge which is fixed to said cartridge loading part, whereby the first and second retriever plates are inserted in sequence through the film retrieving opening into the cartridge fixed to the cartridge loading part and thus the free end of the film which has already been wound in the cartridge may be pulled out of the cartridge while being held between the two plates.

2. An automatic film retriever as set forth in claim 1 characterized in that a cartridge is fixed at a cartridge loading part, the leading ends of the first and second retriever plates slightly inserted into the cartridge through the film retrieving opening of the cartridge and at the same time the spool of the cartridge is rotated by said torque motor in such a direction as the film is wound into the cartridge and thereafter the free end of said first retriever plate is inserted into the cartridge at more than half a circumference or less than a circumference of the cartridge.

3. An automatic film retriever as set forth in claim 1 characterized in that there is provided means for sensing the number of rotation or angle of rotation of each of the motors for moving forward or backward the first retriever plate and the second retriever plate, respectively, and thereby a range of said forward or backward movement may be defined.

4. An automatic film retriever as set forth in claim 1 characterized in that perforations to be aligned when the free end of the film is held and pulled out of the cartridge are provided in the free ends of the first retriever plate and the second retriever plate, while an infrared rays sensor consisting of upper and lower light emitter and light receiver holding the guide hole passage therebetween is arranged to sense if the film is pulled out or not.

5. An automatic film retriever as set forth in claim 1 characterized in that said first and second retriever plates have respective tail ends; a first rotor is connected to said first motor and the tail end of said first retriever plate is wound around said first rotor; and a second rotor is connected to said second motor and the tail end of said second retriever plate is wound around said second rotor, whereby rotation of said first and second rotors imparts movement to the free ends of said retriever plates, respectively.

6. An automatic film retriever as set forth in claim 1 characterized in that said first and second retriever plates have respective tail ends; the tail end of said first retriever plate is attached to a first block which is slidably mounted on guide rail means, said first block having a rack gear engaged with a first pinion which is connected to said first motor; and the tail end of said second retriever plate is attached to a second block which is slidably mounted on said guide rail means, said second block having a rack gear engaged with a second pinion which is connected to said second motor, whereby rotation of said first and second pinions imparts movement to the free ends of said retriever plates, respectively.

* * * * *